(12) United States Patent
Ramminger et al.

(10) Patent No.: US 9,943,890 B2
(45) Date of Patent: *Apr. 17, 2018

(54) METHOD FOR CLEANING AND CONDITIONING THE WATER-STEAM CIRCUIT OF A POWER PLANT, ESPECIALLY OF A NUCLEAR POWER PLANT

(71) Applicant: AREVA GMBH, Erlangen (DE)

(72) Inventors: Ute Ramminger, Roth (DE); Joerg Fandrich, Obermichelbach (DE); Fernando-Mario Roumiguiere, Erlangen (DE)

(73) Assignee: AREVA GmbH, Erlangen (DE)

(*) Notice: Subject to any disclaimer, the term of this patent is extended or adjusted under 35 U.S.C. 154(b) by 614 days.

This patent is subject to a terminal disclaimer.

(21) Appl. No.: 14/104,109

(22) Filed: Dec. 12, 2013

(65) Prior Publication Data

US 2014/0102482 A1 Apr. 17, 2014

Related U.S. Application Data

(63) Continuation of application No. PCT/EP2013/053919, filed on Feb. 27, 2013.

(30) Foreign Application Priority Data

Feb. 28, 2012 (DE) .................. 10 2012 203 010

(51) Int. Cl.
*B08B 7/04* (2006.01)
*B08B 9/027* (2006.01)
(Continued)

(52) U.S. Cl.
CPC ............ *B08B 9/032* (2013.01); *C23F 11/141* (2013.01); *F22B 37/483* (2013.01); *F22B 37/56* (2013.01);
(Continued)

(58) Field of Classification Search
None
See application file for complete search history.

(56) References Cited

U.S. PATENT DOCUMENTS 2,315,226 A * 3/1943 Rohlin .................. F22B 37/265
122/459
4,220,194 A * 9/1980 Shade, Jr. ............. F22B 37/266
122/32
(Continued)

FOREIGN PATENT DOCUMENTS

CN 1557746 A 12/2004
CN 101255307 A 9/2008
(Continued)

OTHER PUBLICATIONS

English Translation of DE2450253, accessed on Aug. 2015.*
(Continued)

*Primary Examiner* — Eric Golightly
*Assistant Examiner* — Arlyn I Rivera-Cordero
(74) *Attorney, Agent, or Firm* — Laurence A. Greenberg; Werner H. Stemer; Ralph E. Locher

(57) ABSTRACT

A method for cleaning and conditioning the water-steam circuit of a power plant, especially of a nuclear power plant, uses an amine as a film-forming agent. The amine is metered into the working medium circulating in the water-steam circuit. The film-forming agent forms a hydrophobic film on the surfaces of the circuit. During the process, the concentration of at least one impurity contained in the water and the concentration of the film-forming agent in at least in the feed water of the steam generator are measured and monitored. The concentration of the film-forming agent is varied, as needed, subject to the concentration of the impurity.

15 Claims, 3 Drawing Sheets

(51) Int. Cl.
    B08B 9/032      (2006.01)
    C23F 11/14      (2006.01)
    F22B 37/56      (2006.01)
    F22B 37/48      (2006.01)
    G21C 15/28      (2006.01)
    G21C 17/022     (2006.01)
    G21D 1/00       (2006.01)

(52) U.S. Cl.
    CPC ......... *G21C 15/28* (2013.01); *G21C 17/0225* (2013.01); *G21D 1/00* (2013.01); *Y02E 30/40* (2013.01)

(56) References Cited

U.S. PATENT DOCUMENTS

| | | |
|---|---|---|
| 4,975,219 A | 12/1990 | Sato et al. |
| 4,999,161 A | 3/1991 | Pierce et al. |
| 5,026,523 A | 6/1991 | Taya |
| 5,587,025 A | 12/1996 | Jevec et al. |
| 2014/0102481 A1* | 4/2014 | Ramminger .......... C23F 11/141 134/18 |

FOREIGN PATENT DOCUMENTS

| | | | |
|---|---|---|---|
| DE | 107962 | 8/1974 | |
| DE | 2450253 * | 5/1975 | ............. F01D 25/00 |
| DE | 3904733 A1 | 8/1989 | |
| DE | 69007822 T2 | 7/1994 | |
| EP | 0807696 A1 | 11/1997 | |
| EP | 0902232 A1 | 3/1999 | |
| JP | H08299968 A | 11/1996 | |
| JP | 2003343804 A | 12/2003 | |
| JP | 2008190933 A | 8/2008 | |
| JP | 2008250592 a | 10/2008 | |
| JP | 2011033301 A | 2/2011 | |

OTHER PUBLICATIONS

English Translation of JP2011033301, accessed on Aug. 2015.*
Wang Yaoxi, "To Control Corrosion of System with Amine", Electric Technology, No. 5, Dec. 31, 1983, pp. 64-66.
Zhang Yufu "Anticorrosion Technology for Shut-down Thermal Power Equipment by Using Filming Amines", China Power, vol. 34, No. 6, Jun. 30, 2001, pp. 28-30, p. 80—English abstract.

* cited by examiner

METHOD FOR CLEANING AND CONDITIONING THE WATER-STEAM CIRCUIT OF A POWER PLANT, ESPECIALLY OF A NUCLEAR POWER PLANT

CROSS-REFERENCE TO RELATED APPLICATION

This application is a continuation, under 35 U.S.C. § 120, of copending international application No. PCT/EP2013/053919, filed Feb. 27, 2013, which designated the United States; this application also claims the priority, under 35 U.S.C. § 119, of German patent application No. DE 10 2012 203 010.7, filed Feb. 28, 2012; the prior applications are herewith incorporated by reference in their entirety.

BACKGROUND OF THE INVENTION

Field of the Invention

The invention relates to a method for cleaning and conditioning the water/steam circuit of a power plant, in particular of a nuclear power plant. Here, the term "conditioning" should be understood to mean a measure by means of which the surfaces of the components of the water/steam circuit can be protected from corrosion. When surfaces are mentioned, this should be understood to mean, on the one hand, the inner surfaces of e.g. lines, heat exchangers and containers and, on the other hand, surfaces of components such as turbine blades around which the work medium (water, steam) of the circuit flows. By way of example, German published patent application DE 2625607 and German patent DD 107962 describe methods in which film-forming amines (FFA) are metered into the secondary circuit of pressurized water reactors during power operation. The object of conditioning of the type in question is to generate a thin film on the surfaces which is as contiguous as possible, with a thickness of at most one to two molecule layers. However, conventional methods result in the risk here that thicker FFA-deposits are formed, which, on the one hand, interfere with operation, by virtue of e.g. reducing heat transport in steam generators or other heat exchangers or narrowing flow cross sections. Moreover, there is the risk of parts of the deposits detaching and damaging turbine blades or adversely affecting mechanical filter installations and ion exchangers, so that the latter two have to be replaced.

A further problem occurring during the generation of a film is that impurities, which are present on the component surfaces or adhere thereto, are released during the metering of the film-forming agent and pass into the work medium. This effect is based on two causes. Firstly, molecules of the film-forming agent, which, due to their chemical make-up, act like a surfactant, attach to particles of corrosion products such as magnetite, as a result of which the particles are detached from the surface and are kept in colloidal suspension in the work medium. Secondly, ionic impurities, for example cations, such as sodium ions, potassium ions, magnesium ions and calcium ions, and anions, such as chloride ions, fluoride ions, sulfate ions, sulfite ions, carbonate ions and silicate ions, that are adsorbed on the surfaces of the components are displaced from the surface during the adsorption there of the film-forming amines and as a result go into solution.

The effect in question of the film-forming agent is unwanted because impurities which were previously immobilized in a restricted region of the water/steam circuit are distributed over the whole system. Furthermore, there is the risk of predetermined limits for impurities being exceeded such that appropriate countermeasures have to be taken up. By way of example, in the field of nuclear power plants, there must be a time-restricted operation with a power reduction to 30% in the case of a sodium concentration of more than 0.1 mg/kg or a conductivity (downstream of the cation exchanger) of more than 2 µS/cm in the steam generator water and a shutdown of the installation in the case of more than 0.5 mg/kg or 7 µS/cm.

In the case of prior art conventional processes, the aforementioned problems were ignored or, in order to avoid the problems, work was undertaken with very low FFA concentrations, although this led to extremely long processing durations and corresponding costs.

SUMMARY OF THE INVENTION

It is accordingly an object of the invention to provide a method of cleaning and conditioning the water/steam circuit of a power plant which overcome the above-mentioned disadvantages of the heretofore-known devices and methods of this general type.

With the foregoing and other objects in view there is provided, in accordance with the invention, a method of cleaning and conditioning a water/steam circuit of a power plant, in particular a nuclear power plant. The method comprises the following steps:

adding an amine as a film-forming agent to a work medium circulating in the water/steam circuit during power operation, to cause the film-forming agent to form a hydrophobic film on the surfaces of the water/steam circuit;

monitoring a concentration of at least one impurity contained in the work medium and a concentration of the film-forming agent in a steam generator feed water, by measurements during a duration of the method; and modifying the concentration of the film-forming agent depending on the concentration of the at least one impurity.

In other words, the above objects are achieved, in the context of a method as described above, by virtue of the fact that, during power operation, an amine is added to the work medium circulating in the water/steam circuit, which amine acts as film-forming agent and forms a hydrophobic film on the surfaces of the circuit. Here, the method is carried out in such a way that there is control in respect of the concentration of the film-forming agent or the progress of the film formation as well as the effects of the film-forming agent metering in respect of impurities mobilized thereby at practically any time during the method. This is achieved by virtue of the fact that, during the duration of the method, the concentration of at least one impurity and the concentration of the film-forming agent is measured, namely at least in the steam generator feed water, wherein the concentration of the film-forming agent is modified depending on the concentration of at least one impurity. This ensures that, at any time during the method, predetermined guide values and limits of an impurity, in particular a corrosively acting ionic impurity such as e.g. chloride or sodium ions, are maintained or not exceeded. Moreover, it is possible to effectively prevent an impurity, immobilized at a locally restricted surface region of the water/steam circuit, from quickly being mobilized by metering of the film-forming agent and being distributed in large quantities in the whole circuit.

As a countermeasure to an increase in the concentration of an impurity, the metering rate of the film-forming agent can be reduced or interrupted, in particular in view of maintaining limits. A further countermeasure consists of reducing the concentration of impurities passing into the work medium. This preferably occurs by virtue of the water/steam circuit being purged and, in the process, particulate impurities, inter alia, being removed by blowing down of the steam generator. This measure preferably occurs, for example for reasons of economy, directly following an interruption of the metering of the film-forming agent. It is also feasible that, in order to remove impurities from the water/steam circuit, filters are employed, for example the filter installations of the condensate cleaning system, which is part of the power plant.

In a particularly preferred method variant, the concentration of the film-forming agent and of the impurity is established at a plurality of measurement points distributed over the water/steam circuit, as a result of which a statement can be made in respect of the effect at different points of the water/steam circuit of the effects of a measure, for example a reduction in the metering rate of the film-forming agent. Moreover, the accuracy of the method open-loop or closed-loop control is increased.

In addition to the above-described measures for avoiding the disadvantageous effects explained at the outset, metering of the film-forming agent in a method according to the invention is carried out in such a way that, in the water phase of the water/steam circuit, at least in the steam generator feed water, there is a concentration of 1 to 2 ppm, preferably of 1 to 1.5 ppm. It was found that if work is conducted within these boundaries, in particular with at most up to 1.5 ppm film-forming agent, the formation of relatively thick layers of the film-forming agent can be avoided. It was found that, in many cases, an adequate film is already present on the surfaces when the aforementioned concentration or target concentration has been reached.

However, a single-layer or substantially mono-molecular film is obtained with greater reliability on the surfaces, substantially covering the latter completely, if the method is continued under the aforementioned premises until the concentration of the film-forming agent—at a constant metering rate—at a plurality of measurement points distributed over the water/steam circuit remains constant averaged over time at a plurality of measurement points (M1, M2, M3), i.e., if an equilibrium concentration sets in at the measurement points. The measurement points already mentioned above are, in this case and in general, distributed such that at least one measurement point is situated in the one-phase region and at least one measurement point is situated in the two-phase region of the water/steam circuit. The aforementioned mean averaged over time is understood to mean the profile of the trend which emerges if fluctuations due to the measurement technologies have been eliminated by suitable methods of conventional error calculation.

Monoamines with a hydrocarbyl comprising 8 to 22 carbon atoms were found to be particularly effective for both the cleaning effect and for the film formation, with octadecylamine being particularly suitable in this case. Monoamines of the present type are available as waxy substance at room temperature. Conventional emulsions produced therefrom usually contain relatively large amounts of organic emulsifiers, which can have damaging effects in the water/steam circuit. Therefore, the FFA is preferably employed in the pure form during the method according to the invention, namely as an aqueous emulsion without the addition of emulsifiers, which can be obtained by pure mechanical mixing under the application of increased temperature.

Other features which are considered as characteristic for the invention are set forth in the appended claims.

Although the invention is illustrated and described herein as embodied in a method for purifying and conditioning the water-steam circuit of a power plant especially of a nuclear power plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
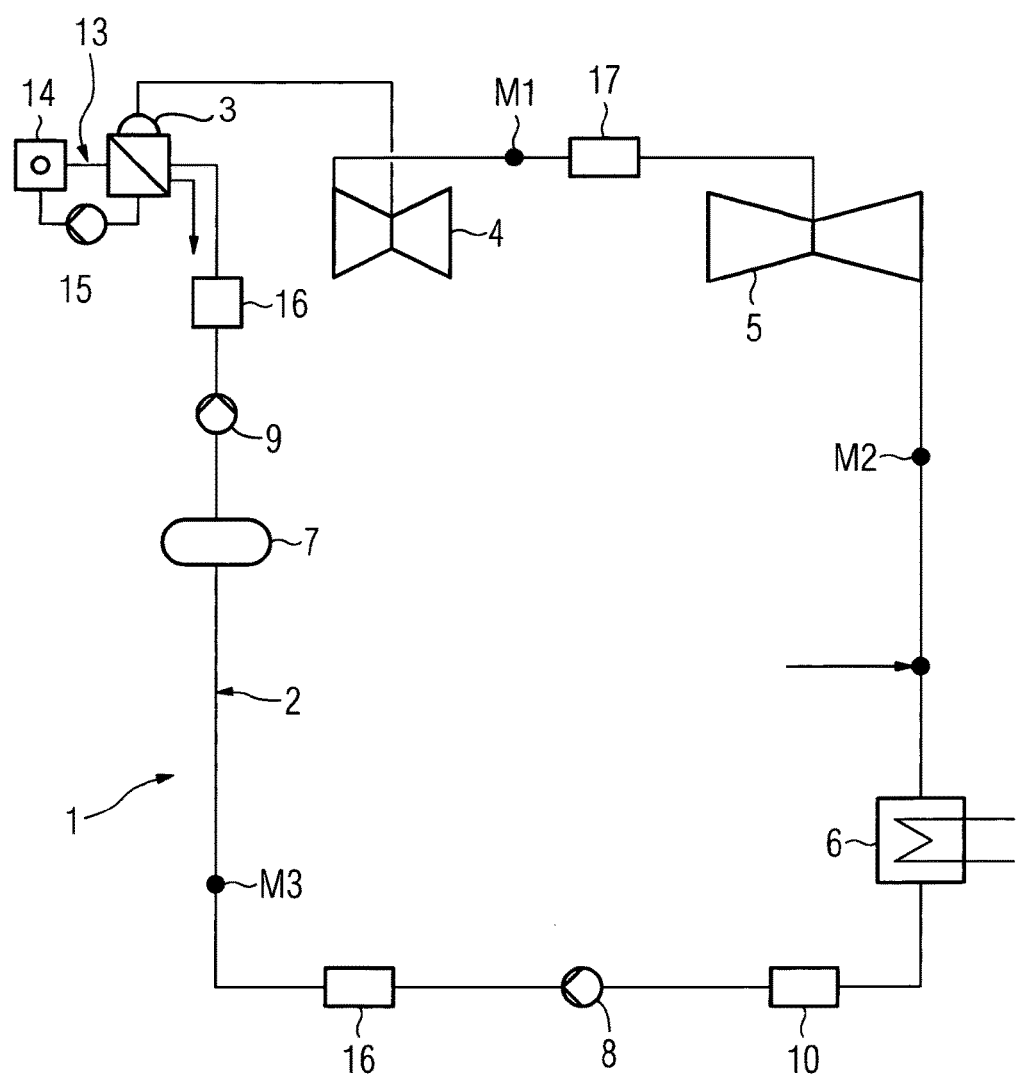
FIG. 1 shows, in a very schematic view, the water/steam circuit of a pressurized water reactor (PWR)

Referring now to the figures of the drawing in detail and first, particularly, to FIG. 1 thereof, there is shown a water/steam circuit 1 (abbreviated WSC in the following text) of a pressurized water reactor (PWR) that includes a piping system 2, a plurality of steam generators 3, normally a plurality of turbines, for example a high-pressure (HP) turbine 4 and a low-pressure (LP) turbine 5, a water separator intermediate superheater 17 between the HP and LP turbines, a condenser 6, a feed water container 7, a condensate pump 8 arranged between the condenser 6 and the feed water container 7, a plurality of feed water preheaters 16 and a feed water pump 9 arranged between the feed water container 7 and the steam generator. Moreover, downstream of the condenser 6, there is a condensate cleaning system 10, which can comprise mechanical filters and, likewise, ion exchangers. On the primary side, the steam generator 3 is connected to the primary circuit 13 of the nuclear reactor, which includes a reactor pressure vessel 14 and a main coolant pump 15.

As mentioned above, the cleaning and conditioning method is carried out during the power operation. This also comprises phases during the startup and shutdown of the power plant. In the exemplary embodiment described below, the conditioning of the water/steam circuit or the metering of a film-forming amine is carried out just before shutting down the nuclear reactor. In the description, reference is made to ODA (octadecylamine) as a film-forming agent in an exemplary manner. The continuous monitoring of concentrations or concentration changes in ODA and impurities (see step II in FIG. 3), carried out from the start of the method, is brought about by a plurality of measurement points arranged at different positions in the WSC 1. Some of these measurement points M1, M2, M3 are depicted in FIG. 1 in an exemplary manner. The film-forming agent may be metered in at any expedient location within the WSC, such as, for instance at the illustrated location just upstream of the condenser 6.

As a result of the surfactant-like properties of the ODA, there is a mobilization of impurities from the start of the FFA metering. Thus, as already mentioned above, limits which may not be exceeded are set for the concentration of these impurities. In the case of ionic impurities, the concentration is measured directly, i.e. in relation to a very specific ion with known wet-chemical or physical-chemical measurement methods. However, the concentration can also be determined indirectly, i.e. by the increase in the electrical conductivity of the work medium caused by the mobilization or the passage of ions into the work medium. The measurement methods used in the process are well known to a person skilled in the art, and so these do not have to be discussed in detail. A further parameter important for carrying out the method in a controlled manner is the FFA or ODA concentration in the work medium—the water present in the WSC.

Finally, as a result of the ODA metering, corrosion products are also released, i.e. very fine particles of magnetite, which adhere to the surfaces and, as a result of the effect of ODA, go into colloidal solution. Since the majority of corrosion products can be traced back to metal oxides such as magnetite, it is normally sufficient only to carry out measurements in this respect. In the process, e.g. the iron content of the feed water is determined in a known fashion. Finally, the pH-value is also monitored in order to prevent corrosion of the metallic components of the WSC 1. It is also feasible for the TOC (total organic carbon) value to be monitored in order to exclude a possible decomposition of the added ODA at the prevalent conditions, i.e. temperatures of over 250°, and hence the formation of decomposition products which could act corrosively.

The ODA metering or the amount of ODA metered into the WSC 1 per unit time is—on the basis of the measurement data established at the measurement points M1 to M3 regulated such that the concentrations of the type of impurities that have passed into the work medium due to the ODA metering remain below predetermined limits (see step III in FIG. 3). Moreover, by controlling the afore-mentioned concentration values, it is already possible to identify a trend in a timely fashion such that a countermeasure can be introduced in a timely fashion, e.g. such that the metering of ODA can be reduced or interrupted. Here, it should be noted that a change in metering only has an effect a couple of hours later due to the volume of water and the length of the piping of the WSC 1. However, this time delay plays practically no role during a method according to the invention since a change of a critical concentration value is identified by permanent whole control at a plurality of measurement points M1 to M3, long before said value has reached its critical limit.

In order to have an indication of which ODA amounts are required for a given WSC 1, it is expedient to estimate what approximate amount of ODA is necessary to generate a mono-molecular hydrophobic film on the surfaces of the WSC. This amount can then still be multiplied by a factor in order to take into account the roughness of the surfaces, which, after all, is significant in the case of sub-microscopic observation, and effects which use up ODA, for example the degree of contamination of the WSC. On the basis of this estimate, it is possible, in the case of a given ODA metering rate, to specify a defined period of time in which an ODA film which completely covers the surfaces, e.g. a mono-molecular ODA film, has been created.

Figure 3:
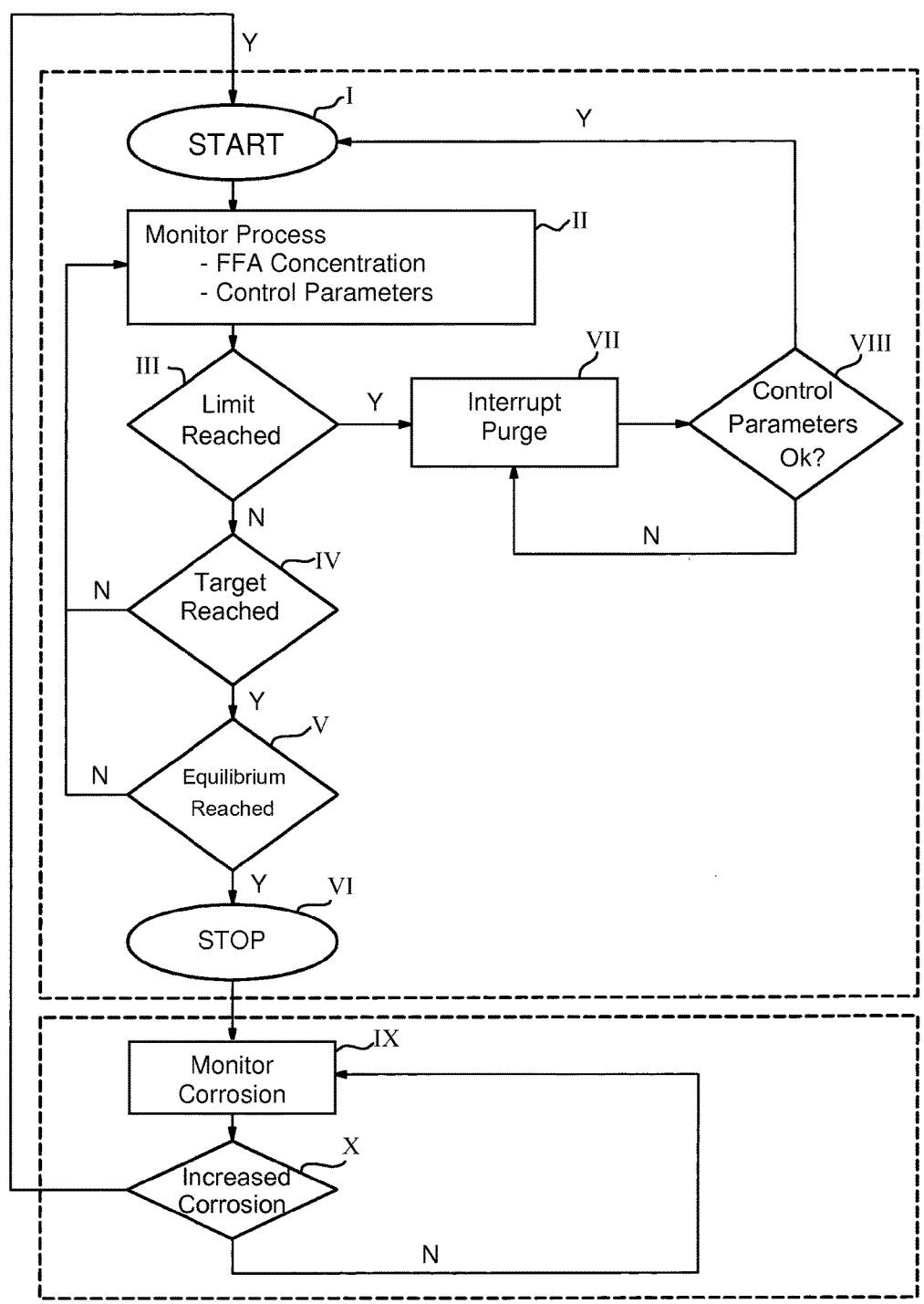
FIG. 3 shows a flowchart of the novel conditioning method.

When a critical concentration of an impurity is reached (step III in FIG. 3), an effective measure for reducing the critical concentration lies in interrupting the FFA metering and a subsequent purging or flushing or blowing down of the steam generator, during which the impurity is removed from the WSC (step VII in FIG. 3). In the process, there is continuous monitoring of whether the installation-specific control parameters or concentrations lie in an admissible range (step VIII in FIG. 3). If this is the case, the conditioning is continued by resuming the FFA metering.

Figure 2:
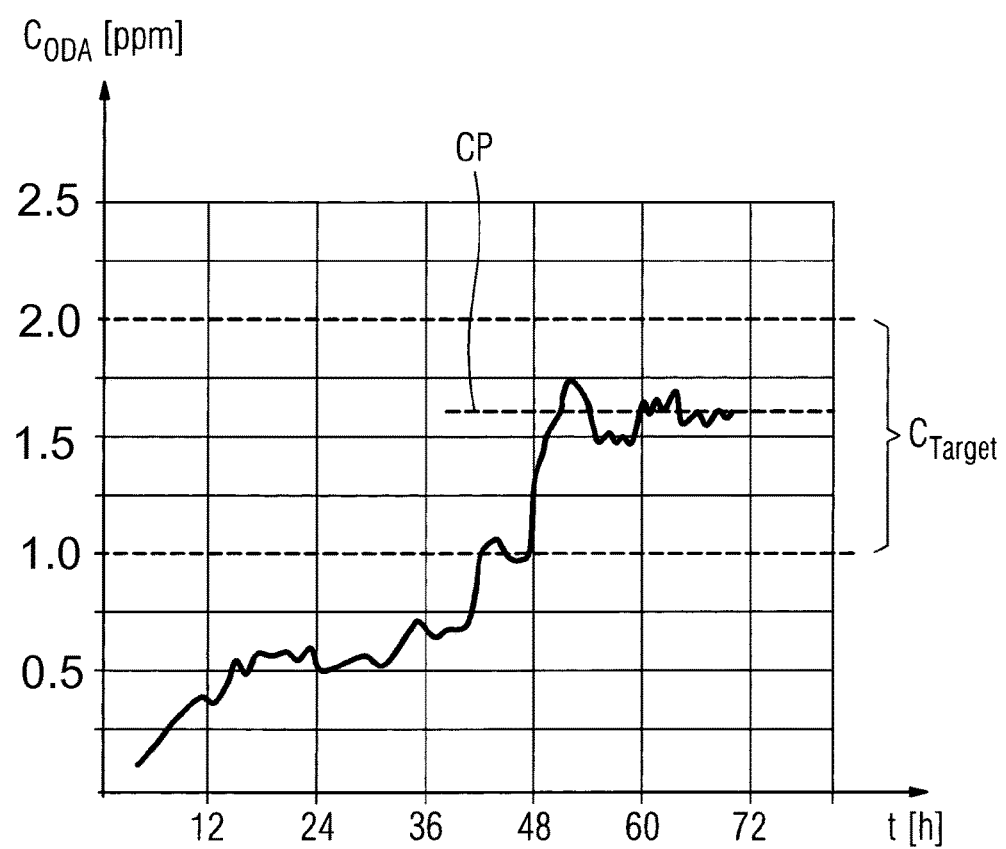
FIG. 2 shows a diagram which reproduces the time profile of the concentration of ODA in the steam generator feed water caused by ODA metering.

The concentration of ODA in the aqueous phase is regulated (closed-loop controlled) by appropriate metering rates in such a way that this value, practically until the end of the process, does not exceed an upper absolute safety limit of 2 ppm, preferably 1.5 ppm. As a result, this prevents too strong a mobilization of impurities, which goes beyond the set limits, or a no longer controllable massive ODA precipitation from occurring. It also ensures that no unwanted massive ODA deposits are formed. In so doing, metering is such that initially there is a low ODA concentration, which only rises to a target concentration of above 1 ppm, at most up to 1.5 ppm or 2 ppm ($C_{Target}$ in FIG. 2), toward the end of the method. The addition preferably continues until the ODA concentration with increasing tendency has reached the maximum values of 2 ppm or 1.5 ppm (step VI in FIG. 3). In order to determine the target concentration, the measurement at one measuring point is sufficient, wherein, preferably, the target concentration in the steam generator feed water (measurement point M1) is measured.

Reaching the target concentrations mentioned in the preceding paragraph could already be a termination criterion for the metering of the film-forming agent or ODA, i.e. a sign for a film being formed on the surfaces of the water/steam circuit, which completely covers the latter. The profile of the ODA concentration in the case of unchanging ODA metering rate is preferably observed in addition to the criterion mentioned in the preceding paragraph. If the equilibrium concentration of the ODA is reached at a plurality of measurement points, preferably at all measurement points, M1 to M3 in the example, i.e. if an unchanging or slightly falling ODA concentration is to be observed (step V in FIG. 3), the time has been reached to end the ODA metering or the conditioning method (step VI in FIG. 3; line CP in FIG. 2). The unchanging ODA concentration toward the end of forming the film could be traced back to the fact that the formation of ODA double and multiple layers is favored for kinetic and/or thermodynamic reasons and therefore occurs more quickly than the initial film formation on the metallic surfaces of the WSC 1.

The ODA film applied to the surfaces of the WSC can lose or reduce its effectiveness over time, for example by virtue of it in part detaching from surfaces or for instance it being subjected to thermal or chemical decomposition processes. It is therefore expedient to undertake a refresh conditioning at a given time. To this end, permanent monitoring of the work medium for the presence of corrosion products, i.e. products connected with the formation of oxidation layers, for example metal ions originating from the component materials of the WSC, is expedient. As soon as it is possible to identify a—significant—increase of corrosion products (step X in FIG. 3), a conditioning of the type described above is put into motion.

The following summarizes and lists the various steps illustrated in the flowchart of FIG. 3.

Step I Start of FFA conditioning
Step II Process monitoring
   FFA concentration (M1-M3 in FIG. 1)
   Control parameters as per installation specification
Step III Limit of control parameters reached?
Step IV Target concentration of FFA reached in M1?

Step V Equilibrium concentration of FFA reached over M1-M3?
Step VI End of FFA conditioning
Step VII Interrupt metering, purging
Step VIII Values of the control parameters in an admissible range?
Step IX Process monitoring of corrosion products
Step X Increase in the concentration of corrosion products?

The invention claimed is:

1. A method of cleaning and conditioning a water/steam circuit of a power plant, the method comprising:
adding an amine as film-forming agent to a work medium circulating in the water/steam circuit during power operation, to cause the film-forming agent to form a hydrophobic film on the surfaces of the water/steam circuit;
monitoring a concentration of at least one impurity contained in the work medium by directly measuring the at least one impurity during a duration of the method and monitoring a concentration of the film-forming agent in a steam generator feed water by directly measuring the concentration of the film-forming agent during a duration of the method;
modifying the concentration of the film-forming agent depending on the directly measured concentration of the at least one impurity; and
decreasing a metering rate of the film-forming agent in the case of an increase in the directly measured concentration of the at least one impurity.

2. The method according to claim 1, which comprises measuring the concentration of the film-forming agent and the concentration of the at least one impurity at a plurality of measurement points distributed over the water/steam circuit.

3. The method according to claim 1, which comprises interrupting a metering-in of the film-forming agent if the concentration of the at least one impurity approaches a threshold value.

4. The method according to claim 1, wherein at least one measurement point is disposed in a dual-phase region of the water/steam circuit and at least one measurement point is disposed in a one-phase region of the water/steam circuit.

5. The method according to claim 1, which comprises carrying out the method in a nuclear power plant.

6. The method according to claim 1, which further comprises purging the water/steam circuit.

7. The method according to claim 6, which comprises purging the water/steam circuit directly following an interruption of a metering-in of the film-forming agent.

8. The method according to claim 1, which comprises using a monoamine with a hydrocarbyl comprising 8 to 22 carbon atoms as the film-forming agent.

9. The method according to claim 8, wherein the film-forming agent is octadecylamine.

10. The method according to claim 1, which comprises metering-in the film-forming agent with such a rate that the concentration of the film-forming agent in a liquid phase of the work medium does not exceed a concentration of 2 ppm.

11. The method according to claim 10, wherein a maximum concentration of the film-forming agent of at most 1.5 ppm.

12. The method according to claim 10, which comprises terminating the metering-in of the film-forming agent when the concentration of the film-form ing agent has reached a value of 1 ppm to 2 ppm.

13. The method according to claim 10, which comprises terminating the metering-in of the film-forming agent when the concentration of the film-forming agent has reached a value of 1 ppm to 1.5 ppm.

14. The method according to claim 10, which comprises terminating the metering-in of the film-forming agent when the concentration of the film-forming agent at a constant metering rate remains constant, averaged over time, at a plurality of measurement points in the water/steam circuit.

15. The method according to claim 14, wherein an unchanging concentration of film-forming agent is measured at a plurality of points distributed over the water/steam circuit.

* * * * *